United States Patent
Willeke

(10) Patent No.: US 10,012,526 B2
(45) Date of Patent: Jul. 3, 2018

(54) WINDSHIELD WASHER FLUID VENDING SYSTEM WITH PORTABLE EXCESS FLUID CONTAINERS

(71) Applicant: Chris Willeke, Hudson, WI (US)

(72) Inventor: Chris Willeke, Hudson, WI (US)

( * ) Notice: Subject to any disclaimer, the term of this patent is extended or adjusted under 35 U.S.C. 154(b) by 0 days.

(21) Appl. No.: 15/296,871

(22) Filed: Oct. 18, 2016

(65) Prior Publication Data
US 2017/0050840 A1 Feb. 23, 2017

Related U.S. Application Data

(63) Continuation-in-part of application No. 14/682,736, filed on Apr. 9, 2015.

(60) Provisional application No. 61/977,460, filed on Apr. 9, 2014.

(51) Int. Cl.
| | | |
|---|---|---|
| B67D 7/30 | (2010.01) | |
| G01F 11/00 | (2006.01) | |
| G01F 23/30 | (2006.01) | |
| B67D 7/02 | (2010.01) | |
| B60S 5/00 | (2006.01) | |
| B67D 7/78 | (2010.01) | |
| B60S 1/50 | (2006.01) | |

(52) U.S. Cl.
CPC .............. G01F 23/30 (2013.01); B60S 5/00 (2013.01); B67D 7/02 (2013.01); B67D 7/78 (2013.01); B60S 1/50 (2013.01)

(58) Field of Classification Search
CPC ... G01F 23/30; B60S 5/00; B60S 1/50; B67D 7/02; B67D 7/78; G07F 13/00; G07F 13/10

USPC ............................................ 222/20, 2, 192
See application file for complete search history.

(56) References Cited

U.S. PATENT DOCUMENTS

| | | | | |
|---|---|---|---|---|
| 3,601,284 A | * | 8/1971 | Yamawaki | B67D 7/14 222/2 |
| 5,257,423 A | * | 11/1993 | Jacobsen | A47K 1/00 312/228 |
| 5,957,329 A | * | 9/1999 | Kenney | B60S 5/00 222/1 |
| 6,059,143 A | * | 5/2000 | Weir | A45F 3/00 222/184 |
| 6,367,658 B1 | * | 4/2002 | Kenney | B67D 7/06 222/14 |
| 6,640,997 B1 | * | 11/2003 | Anderson | B67D 7/308 222/153.03 |
| 6,910,509 B1 | * | 6/2005 | Wheeler | B67D 7/02 141/18 |
| 8,126,589 B1 | * | 2/2012 | Parker | G07F 13/065 221/96 |
| 8,443,851 B2 | * | 5/2013 | Novak | B60K 15/04 141/198 |
| 2002/0130142 A1 | * | 9/2002 | Wheeler | B60S 5/00 222/158 |

(Continued)

*Primary Examiner* — Benjamin R Shaw
(74) *Attorney, Agent, or Firm* — Skinner & Associates; Joel Skinner

(57) ABSTRACT

A bulk windshield washer fluid vending system. The system includes a storage tank for storing fluid, a controller communicatively connected to the fluid storage tank for managing flow of fluid from the fluid storage tank, a fluid flow line connected to the controller, and a vending mechanism connected to the fluid flow line and disposed at a predetermined location remote from the fluid storage tank for actuation by a customer.

11 Claims, 26 Drawing Sheets

(56) References Cited

U.S. PATENT DOCUMENTS

| | | | | |
|---|---|---|---|---|
| 2006/0162112 A1* | 7/2006 | Pomeroy | ............... | A47L 1/16 |
| | | | | 15/250.04 |
| 2010/0139782 A1* | 6/2010 | Deline | ............... | B67D 7/16 |
| | | | | 137/87.03 |
| 2010/0258587 A1* | 10/2010 | Wheeler | ............... | B60S 1/50 |
| | | | | 222/2 |
| 2011/0101024 A1* | 5/2011 | Ding | ............... | F17C 7/02 |
| | | | | 222/2 |
| 2012/0125947 A1* | 5/2012 | Becker | ............... | B65D 75/56 |
| | | | | 222/105 |
| 2012/0186666 A1* | 7/2012 | Auton | ............... | B60S 5/02 |
| | | | | 137/356 |

* cited by examiner

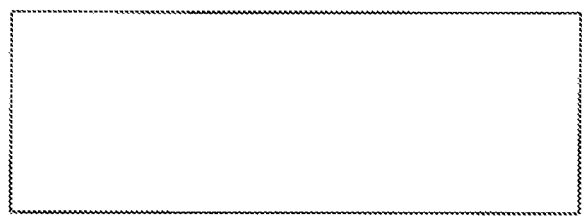
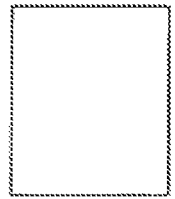
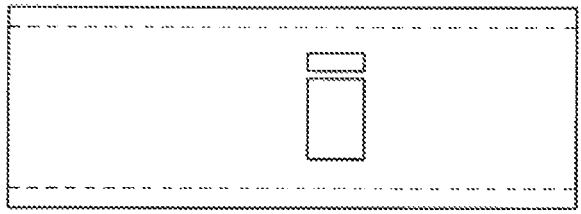

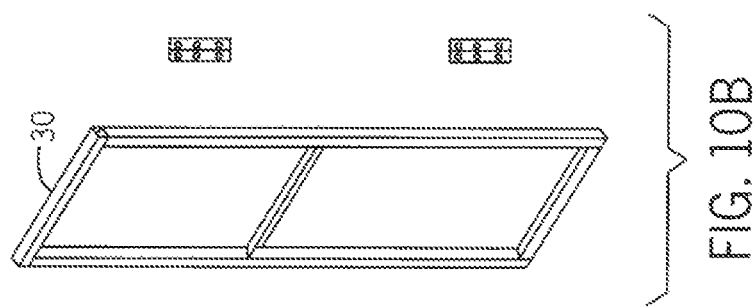
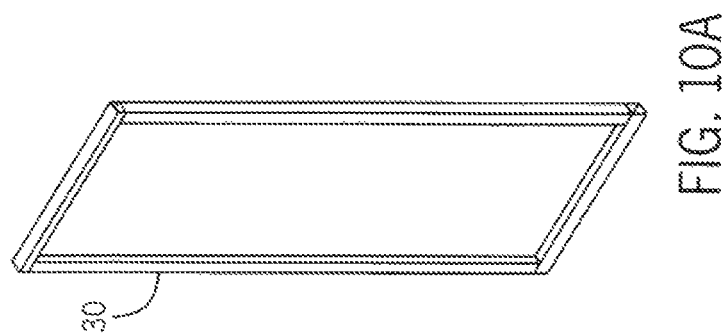

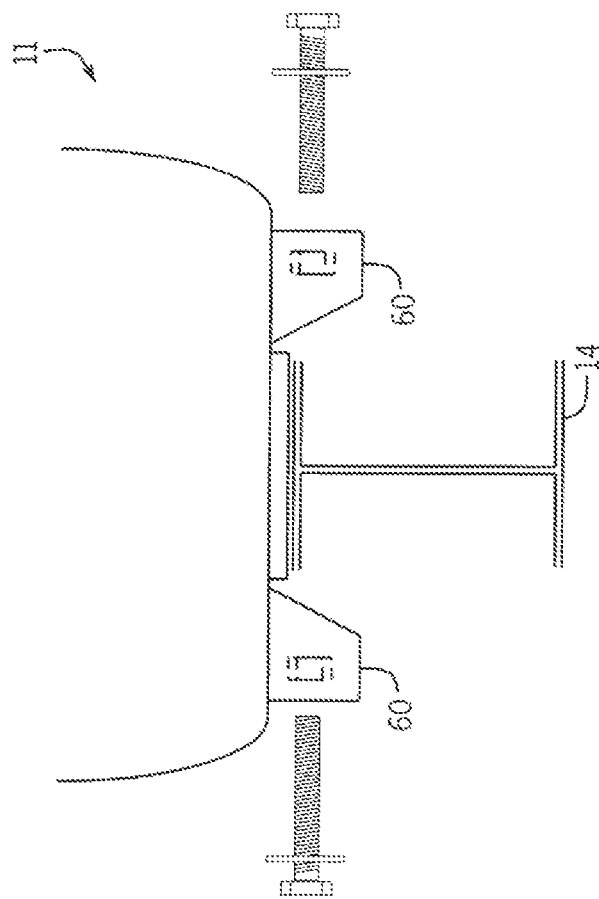

WINDSHIELD WASHER FLUID VENDING SYSTEM WITH PORTABLE EXCESS FLUID CONTAINERS

CROSS REFERENCE TO RELATED APPLICATIONS, IF ANY

This application is a Continuation In Part of U.S. patent application Ser. No. 14/682,736, Filed Apr. 9, 2015, which claims the benefit under 35 U.S.C. § 119(e) of co-pending U.S. Provisional Patent Application Ser. No. 61/977,460, filed Apr. 9, 2014, which is hereby incorporated by reference.

37 C.F.R. § 1.71(E) AUTHORIZATION

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

Field of the Invention

The present invention relates, generally, to vending systems, apparatus and methods. Particularly, the invention relates to a bulk fluid vending system. The invention most particularly relates to a bulk windshield washer fluid vending system. The invention is useful at, for example, gas and service stations, rest areas, auto dealers, auto centers, and rental car centers.

Background Information

Existing technology in this field of supplying windshield washer fluid and other fluids at gas and service stations, rest areas, auto dealers, auto centers, and rental car centers is believed to have significant limitations and shortcomings.

Known systems in the art include U.S. Pat. No. 6,239,939 to Willeke et al, entitled Windshield Washer Fluid Dispensing System, U.S. Pat. No. 6,311,873 to Willeke et al., entitled Automotive Fluid Dispensing System, and U.S. Pat. No. 6,585,011 to Willeke, Jr. et al, entitled Squeegee Bucket Fluid Fill Device and System.

All US patents and patent applications, and all other published documents mentioned anywhere in this application are incorporated by reference in their entirety.

BRIEF SUMMARY OF THE INVENTION

The present invention provides a bulk windshield washer fluid vending apparatus and methods which are practical, reliable, accurate and efficient, and which are believed to constitute an improvement over the background technology.

The apparatus and methods of the invention provide an economical, sustainable and environmentally friendly means of dispensing windshield washer fluids to end users. The invention permits system owners increase profits and better satisfy end user customers. The system minimizes ordering and shipping costs versus common supply by way of plastic jugs (typically approx. 1 gallon containers) shipped and provided in boxes of four (4) or more, and plastic lined boxes. Retail team workers spend less time handling merchandise and can thus focus on customers specific needs. Equipment costs are minimized. Inventory, and therefore cost, is minimized, and so is inventory processing. Product shrinkage is minimized. Paperwork is minimized. And finally, plastic and cardboard trash and waste is minimized both at the system owner's premises and in local landfills. End user customer's windshield washing experience is improved by always having a full, clean squeegee bucket.

In one aspect, the invention provides an apparatus for dispensing bulk fluids, comprising at least one fluid storage tank for storing fluid, a controller communicatively connected to the at least one fluid storage tank for managing flow of fluid from the fluid storage tank, at least one fluid flow line connected to the controller, and a vending mechanism connected to the fluid flow line and disposed at a predetermined location remote from the fluid storage tank and adapted to be actuated by a customer.

In another aspect, the invention provides An apparatus for bulk windshield washer fluid vending at a service station, comprising:

(a) at least one fluid storage tank for storing windshield washing fluid, (b) a controller communicatively connected to the at least one fluid storage tank for managing flow of fluid from the fluid storage tank, (c) at least one fluid flow line connected to the controller, and (d) a vending mechanism connected to the fluid flow line and disposed at a predetermined location remote from the fluid storage tank and adapted to be actuated by a customer, wherein the vending mechanism comprises a hand holdable fluid vending nozzle adapted to be used on a customer to dispense fluid to a remote container, and a customer access unit for controlling flow of fluid to the vending nozzle, the customer access unit being selected from the group of devices consisting of a card reader and a cash payment mechanism.

And in another aspect, the invention provides a method of dispensing fluids, comprising the steps of (a) providing an apparatus for bulk fluid vending, comprising at least one fluid storage tank for storing fluid, a controller communicatively connected to the at least one fluid storage tank for managing flow of fluid from the fluid storage tank, at least one fluid flow line connected to the controller, and a vending mechanism connected to the fluid flow line and disposed at a predetermined location remote from the fluid storage tank and adapted to be actuated by a customer; (b) detecting a dispense signal at the vending mechanism, and (c) delivering fluid from the fluid storage tank to the vending mechanism The present invention is believed to involve novel elements, combined in novel ways to yield more than predictable results. The problems solved by the invention were not fully recognized in the prior art.

The aspects, features, advantages, benefits and objects of the invention will become clear to those skilled in the art by reference to the following description, claims and drawings.

BRIEF DESCRIPTION OF THE SEVERAL VIEWS OF THE DRAWING

FIG. 8A is a view of an embodiment of the vending unit of the system of the invention.

FIG. 8B is a view of an embodiment of the vending unit of the system of the invention.

FIG. 8C is a view of an embodiment of the vending unit of the system of the invention.

FIG. 10A is a further view of the frame of the vending unit.

FIG. 10B is a further view of the frame of the vending.

FIG. 17 is an end view of an embodiment of the tank installation.

DETAILED DESCRIPTION

Figure 1:
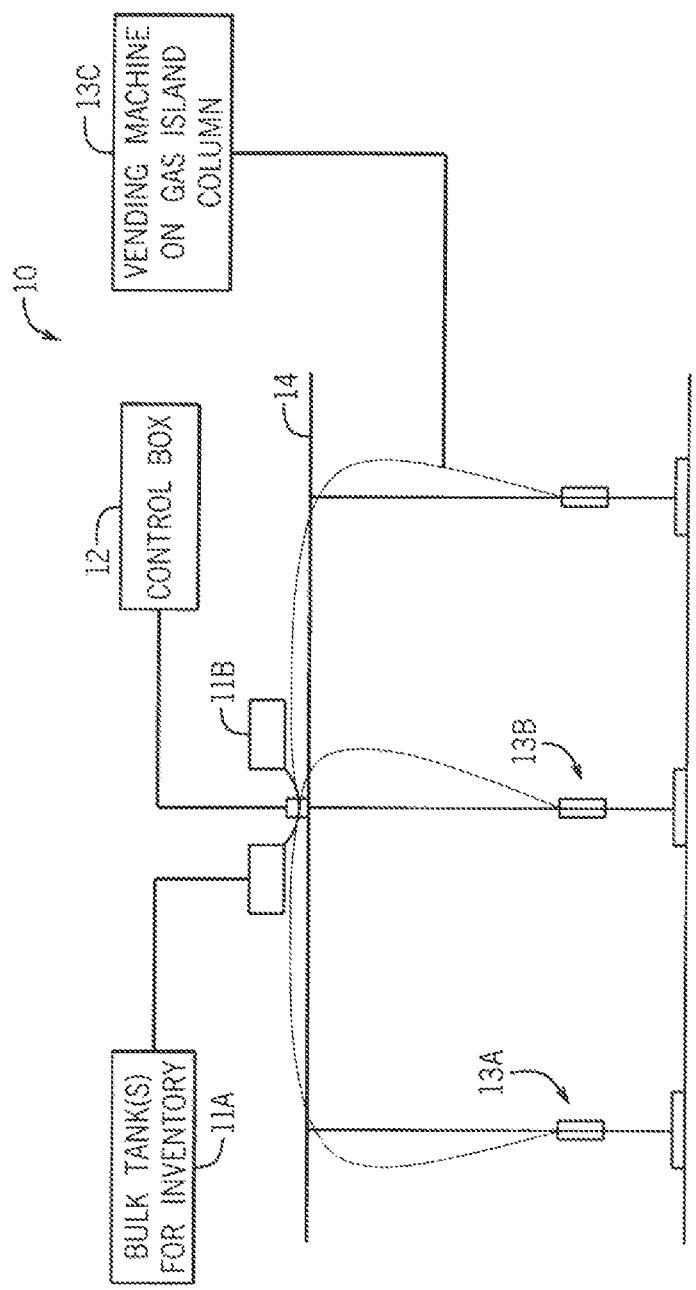
FIG. 1 is a diagram of components and their arrangement of an embodiment of the bulk windshield washer fluid vending system of the present invention.
Figure 2:
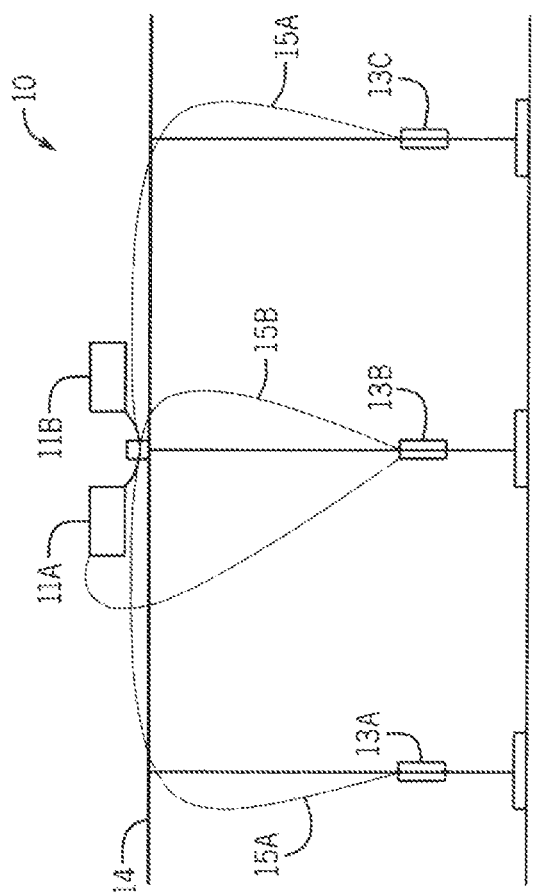
FIG. 2 is a diagram of an embodiment of the plumbing of the system of the invention.
Figure 3:
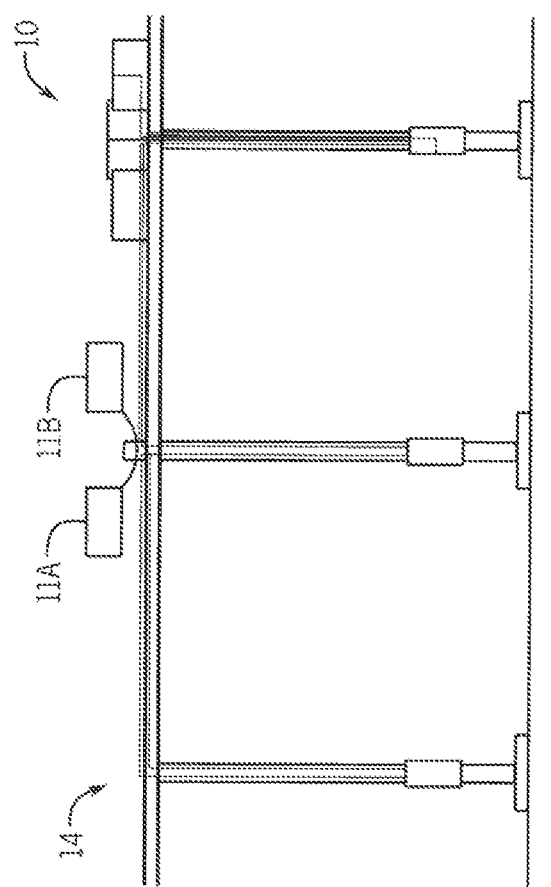
FIG. 3 is a diagram of an embodiment of the electrical wiring of the system of the invention.

Referring to FIGS. 1-3, an embodiment of the bulk windshield washer fluid vending system 10 and its primary components, interconnection and arrangement are shown and described. FIG. 1 is a diagram of components of the bulk windshield washer fluid vending system 10 comprising at least one bulk tank 11, a control box 12 and at least one vending unit 13. In the example embodiment, a pair of bulk tanks 11, preferably 100-gallon tanks, are mounted on 1 ⅝ slotted Unistrut (P1000T) using notch type beam clamp (Fastnal part 48840) mounted on the I-beam superstructure 14 of a facility such as a service station or the like. The tanks 11 are preferably secured with steel strapping. The control box 12 is preferably enclosed with 12"×18" NEMA plastic enclosure. The vending units 13 are installed according to ADA. FIG. 2 is a diagram of the plumbing of the system. Fill-lines 15 are preferably ¾" polyethylene black tubing which convey product up through central column to the control manifold 12 on roof 14. ¾" tubing is provided from manifold to top of each tank. Bulkheads and fittings are provided at lower end of each tank 11 and ⅜" black PE tubing is provided between tanks to create shared inventory. Bulkhead and fitting are provided in one tank, and ½" tubing from tank 11 to control box 12. The control box 12 receives product and supplies on demand to vending machines 13. 5. Each vending machine 13 dispenses via ¼" recoiling hose fitted with hand-held-actuated nozzle. A check valve is provided with adequate spring pressure between hose and nozzle to prevent draining hose and transaction to complete. FIG. 3 is a diagram of the electrical wiring of the system. 115V AC power is provided to the control box 12 on roof structure 14. 2. 24V power is provided to all vending units 13. A communications cable is provided to all vending units 13 from control box 12. Level float switches are provided in tank 11 with connection to the control box 12 PLC. A minimum level switch must put the system out of service. A maximum level switch indicates that the system is full. 5. A light indicator is preferably provided at supply fill-line connection point to indicate when the system 10 is full. Additionally, Red-Level is sensor. Purple—⅜" is Vending supply line. Blue—¼" is bucket insert supply line. Green—¾" is Fill line. Yellow—¾" is union line.

Figure 4:
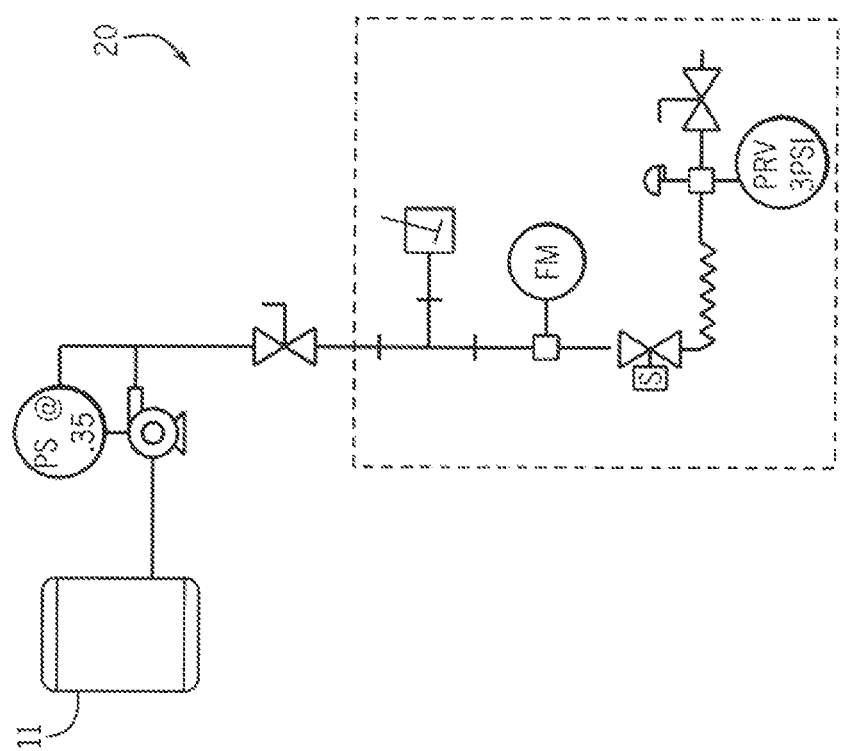
FIG. 4 is circuit schematic of an embodiment of the dispenser of the system.
Figure 5:
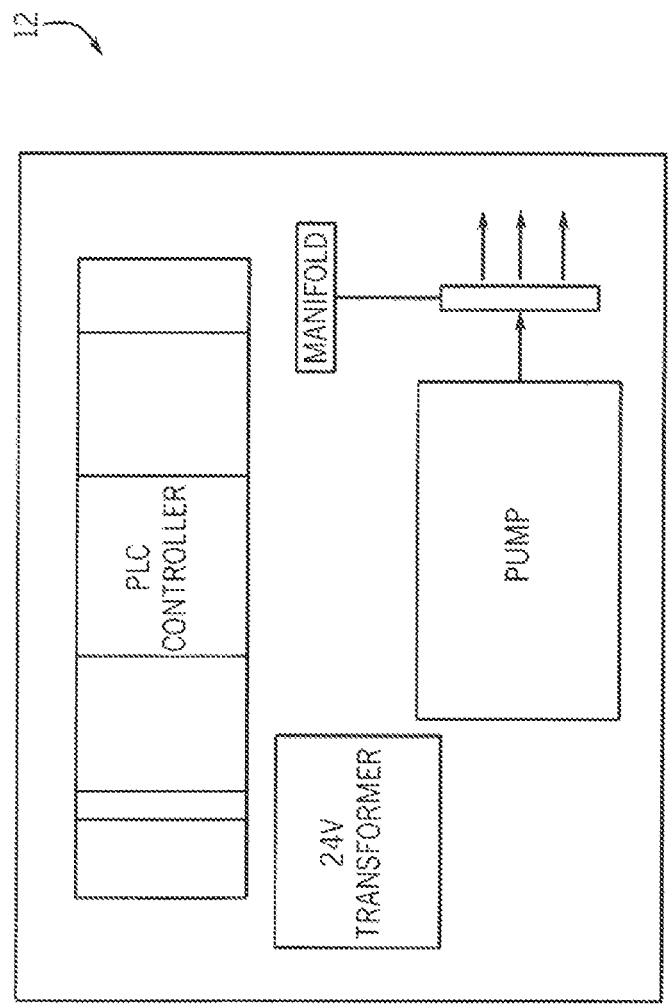
FIG. 5 is an overview diagram of an embodiment of the control box of the system.
Figure 6:
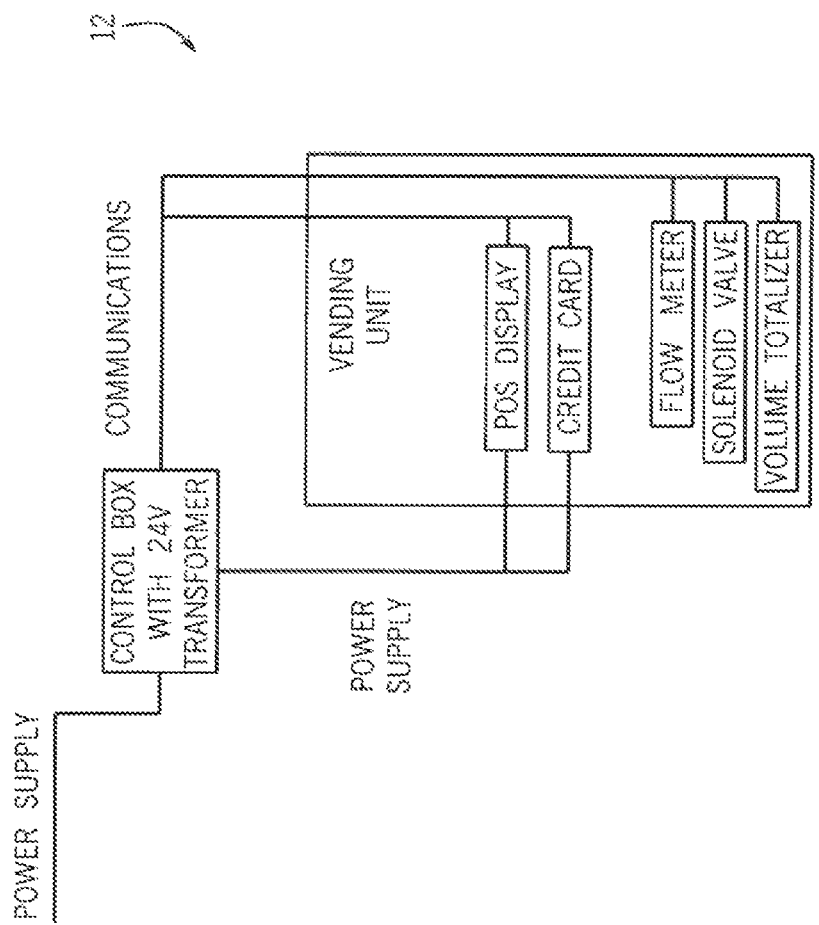
FIG. 6 is a diagram of the electrical connections of an embodiment of the control box.
Figure 7:
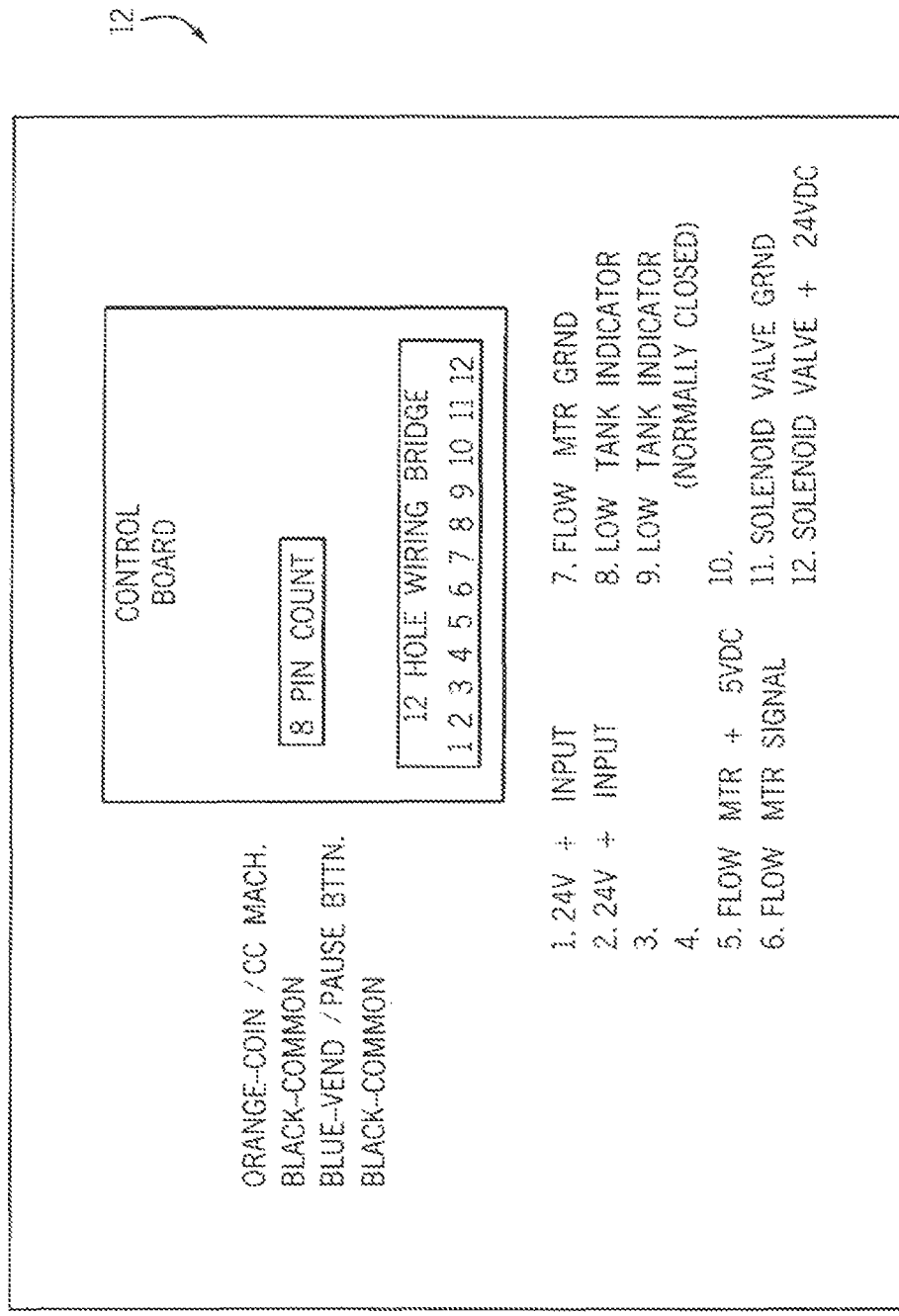
FIG. 7 is a further diagram of the electrical connections of FIG. 6.

FIGS. 4-7 show and describe an embodiment of the electrical components, interconnection and expected behavior of the bulk windshield washer fluid vending system 10. FIG. 4 is circuit schematic 20 of the system 10. FIG. 5 is an overview diagram of the control box 12 of the system 10. FIG. 6 is a diagram of the electrical connections of an embodiment of the control box 12. In the preferred wiring diagram: 115 V AC power is provided to the control box 12 on roof structure 14. 24V power to all vending units 13. Communications cable is provided to all vending units 13 from control box 12. A separate cable is provided from calibration boxes at each vending machine 13 to PLC unit 12. Equipment Specifications preferably include: (1) Program Logic Controller (PLC). (2) ShurFlow 8025, 1.4 GPS, 60 PSI, 115 VAC. (3) Gems Sensors F110 Flow meter (see attachment 2). (4) Vending unit with point of sale device on exterior and scalable box containing calibration dials. FIG. 7 is a further diagram of the electrical connections of FIG. 6. A preferred typical wiring diagram for control board includes: (1) providing 115 V AC to control box 12, (2) providing 24V to the vending units 13, providing communications cable to the vending units 13 from the control box 12, and (4) providing separate cable from the calibration boxes at the vending machine 13 to the PLC unit. Equipment specifications are preferably: (1) a Program Logic Controller (PLC), a SureFlow 8025 (1.4 GPM, 60 PSI, 115V AC), (3) Gems Sensors F110 Flow meter, and (4) Vending units with point of sale device on exterior and a scalable box containing calibration dials. The equipment functions as follows: (1) the PLC initiates a dispensing process when a qualified transaction has occurred through a point of sale device, (2) the PLC opens the solenoid valve at a corresponding vending machine where the qualified transaction was initiated, and monitors the flow meter, (3) the pump on-demand switch activates and pump transfers product through the flow meter and solenoid valve at the vending machine, and (4) the PLC closes the solenoid valve when calibrated set point is achieved. The control board is wired by (1) 110/120V AC power to transformer (preferably a Heath/Zenith DW-125 24 VAC transformer), (2) 24V power to transformer, and (3) the transformer is connected to power supply at a wiring bridge.

Figure 9B:
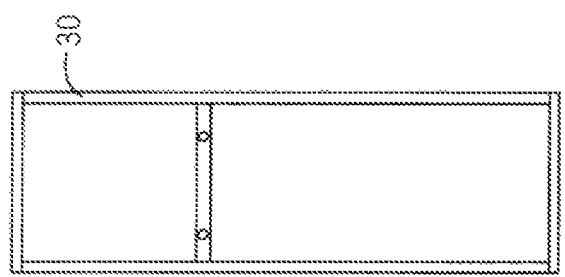
FIG. 9B is a view of the frame of the vending unit.
Figure 9A:
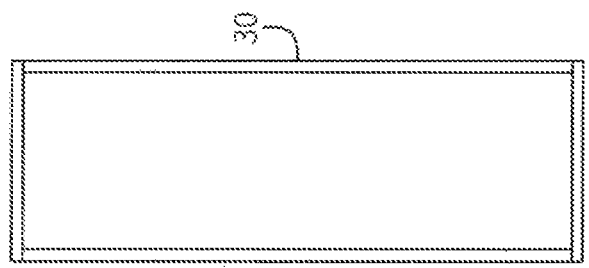
FIG. 9A is a view of the frame of the vending unit.
Figure 14:
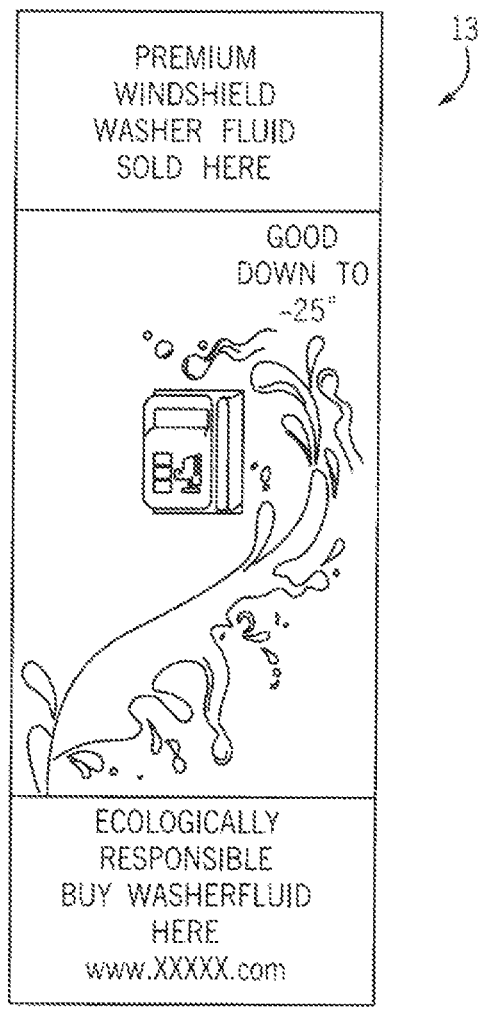
FIG. 14 shows an embodiment of the vending unit of the system.

FIGS. 8, 9, 10 and 14 show and describe an embodiment of the vending unit 13 of the system. FIGS. 8A-C are views of the vending unit. Typical Design: 1. Provide credit card swipe and interactive screen centered 12" from bottom of unit. 2. Provide a NEMA scalable box to house calibration dials, permanently installed inside vending unit. 3. Unit constructed of Aluminum composite paneling 3/32" black plastic with graphics that explain how to operate unit. 4. Provide recoil hose with spring pressure check valve between hose and nozzle. 5. Provide hand-operated nozzle valve at end of hose/check valve. 6. Provide hanger on front of vending unit for hose/nozzle. 7. Provide graphics to assist in transaction and use of equipment (see Attachment 3). FIGS. 9 A and B are views of the frame 30 of the vending unit 13. Typical framing: 1. Frame constructed of 3/4" angle steel frame. 2. Butt ends. 3. Internal frame pivots on rear frame with 5/16" bolts. 4. Provide drawer lock on side of top frame. 5. Provide mounting bracket on rear panel with 3/8" pilot holes. FIGS. 10 A and B are further views of the frame 30. Typical framing: 1. Provide drawer T-handle lock side action for interior frame to lock into rear framework. 2. Provide mounting bracket on rear panel with 1/4" pilot holes. 3. Provide hinges for door to mount on internal frame. FIG. 14 shows an embodiment of the vending unit 13 of the system.

Figure 13:
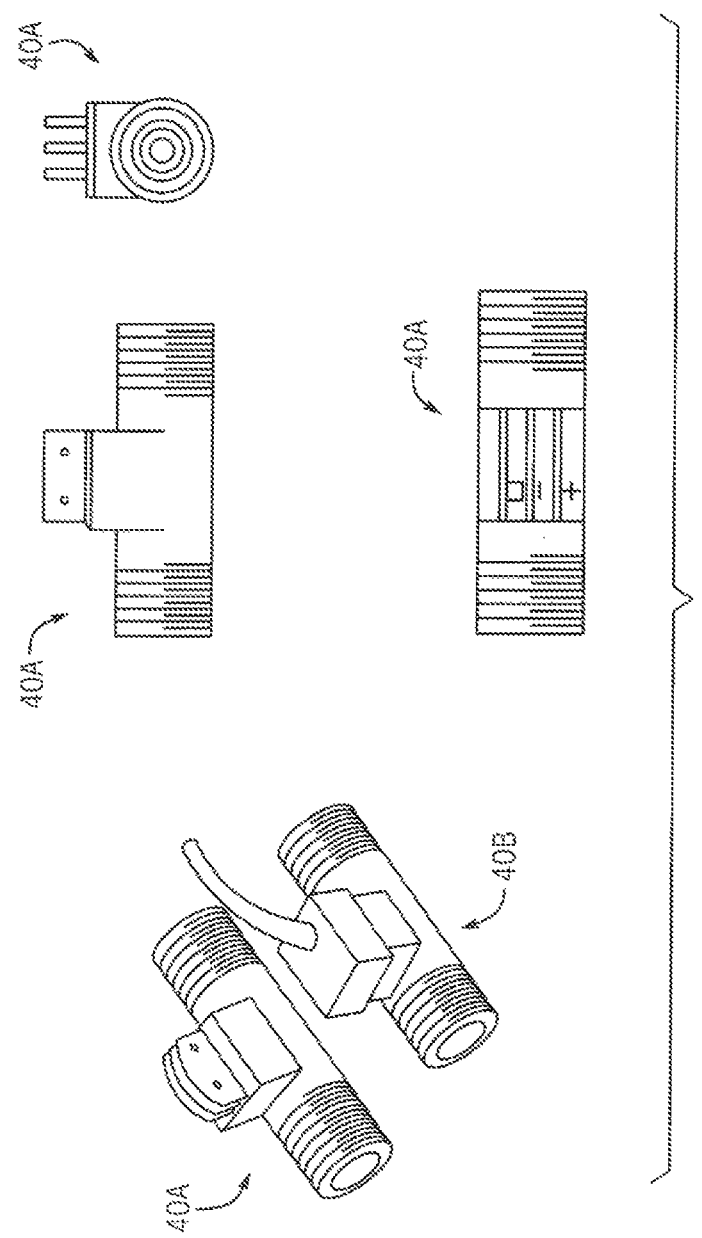
FIG. 13 shows an embodiment of a sensor of the system.

FIG. 13 shows and describes an embodiment of a sensor 40A or 40B of the system 10.

Figure 11:
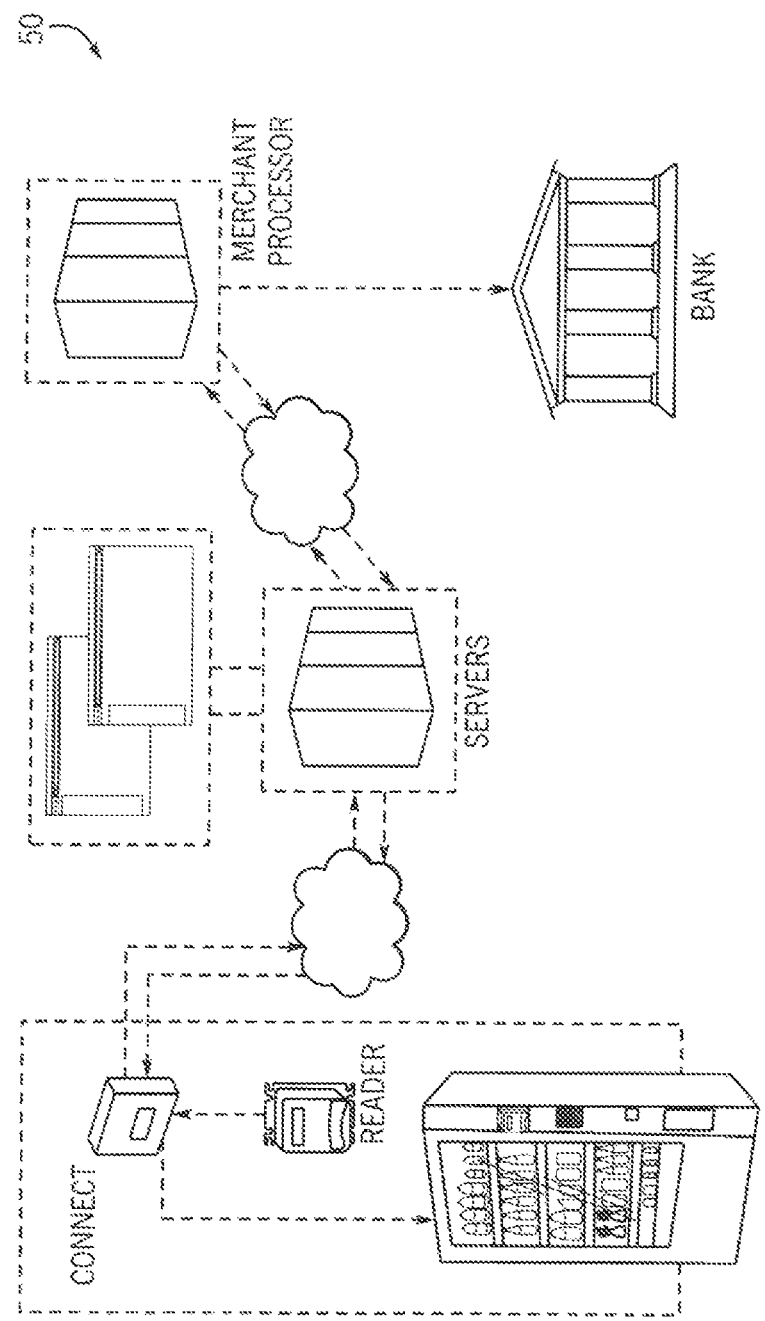
FIG. 11 is a flow diagram showing an embodiment of the bulk fluid vending process of the invention.

FIG. 11 is a flow diagram showing and describing an embodiment of the bulk fluid vending process 50 of the invention. A card is read by a reader. Data is sent to a Connection server. Data is transmitted to the servers. A card transaction request is sent to a merchant processor. If approved, data is sent back to the machine authorizing the purchase. The purchase is executed and data fed to the servers. The transaction is processed and funds deposited to a bank.

Figure 12B:
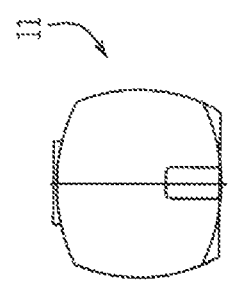
FIG. 12B is a view of an embodiment of the tank of the system.
Figure 12C:
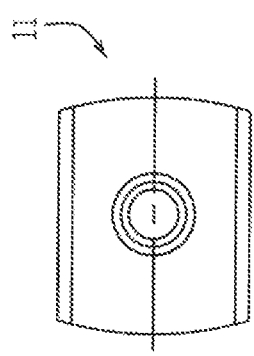
FIG. 12C is a view of an embodiment of the tank of the system.
Figure 12A:
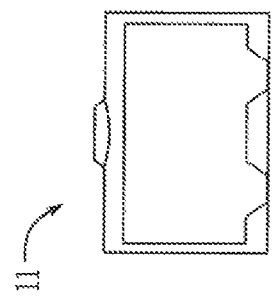
FIG. 12A is a view of an embodiment of the tank of the system.
Figure 15B:
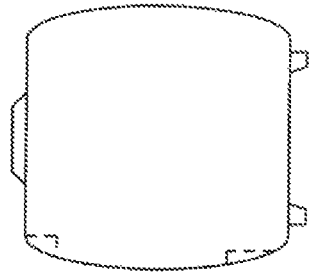
FIG. 15B is a further view of an embodiment of the tank of the system of the invention.
Figure 15C:
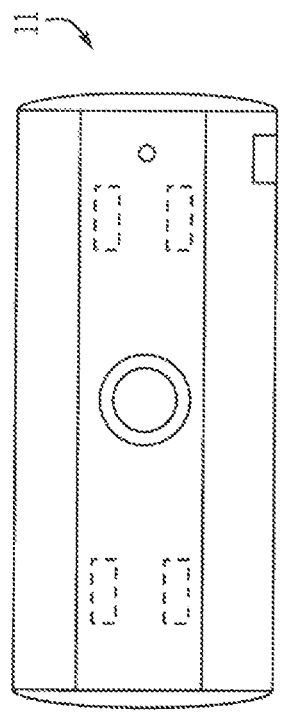
FIG. 15C is a further view of an embodiment of the tank of the system of the invention.
Figure 15A:
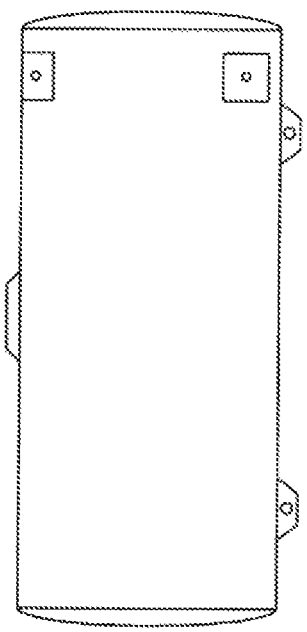
FIG. 15A is a further view of an embodiment of the tank of the system of the invention.
Figure 16C:
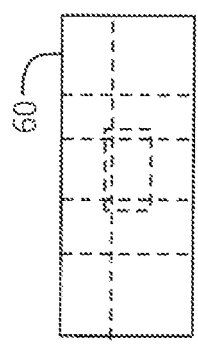
FIG. 16C is a view of an embodiment of a tank foot.
Figure 16B:
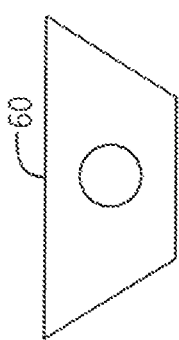
FIG. 16B is a view of an embodiment of a tank foot.
Figure 16A:
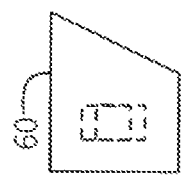
FIG. 16A is a view of an embodiment of a tank foot.

FIGS. 12, 15, 16 sad 17 show and describe an embodiment of the tank 11 of the system. FIGS. 12 A-C are views of the tank 11. FIGS. 15 A-C are further views of the tank 11. Equipment design schedule: 1. Tank capacity is approximately 100-gallon. 2. Provide 5" access cap on top of tank not to exceed depth of feet. 3. Provide 1/2" embedded nuts in feet of tank. 4. Provide 3/4" FPT fitting centered in lower corner recess for outflow and 3/8" FPT in upper recess for bleed line. 5. Provide 3/4" FPT fitting for inflow. FIGS. 16 A-C are views of a tank foot 60. Equipment design schedule: 1. Embed in center of foot 1/2" zinc coated nut for mounting procedure. And, FIG. 17 is an end view of an embodiment of the tank 11 installation. Tank Installation schedule: 1. Place 1/4" spacer (as needed) on I-Beam 14 and center tank over I-Beam on the spacer board. 2. Using 1/2" washer, tighten 1/2"×6" bolts through feet to I-Beam vertical edge.

A preferred embodiment of the apparatus for dispensing bulk fluids comprises at least one fluid storage tank for storing fluid, a controller communicatively connected to the at least one fluid storage tank for managing flow of fluid from the fluid storage tank, at least one fluid flow line connected to the controller, and a vending mechanism connected to the fluid flow line and disposed at a predetermined location remote from the fluid storage tank and adapted to be actuated by a customer. The bulk fluid is preferably windshield washer fluid. In an exemplary embodiment, the fluid storage tank has a capacity of approximately 100 gallons. The controller monitors the supply of fluid in the fluid storage tank and in the vending mechanism. The controller may monitor supply via a float mechanism disposed in the fluid storage tank or the vending mechanism. The controller permits a predetermined flow of fluid from the fluid storage tank to the fluid flow line upon sensing a low fluid condition in the vending mechanism. The controller may include a flow rate sensor. It may include a pump. Alternatively, flow may be managed primarily or all via gravity flow. The fluid flow line is preferably constructed of polyethylene tubing. The vending mechanism may comprise a fluid bucket for holding a predetermined volume of fluid and has an access aperture adapted to hold and supply fluid to a squeegee tool. It may further have a paper towel dispenser. Alternatively, the vending mechanism may comprise a hand holdable fluid vending nozzle adapted to be used on a customer to dispense fluid to a remote container, the vending mechanism further comprises a customer access unit for controlling flow of fluid to the vending nozzle. The vending mechanism may further comprise a customer access unit for controlling flow of fluid to the vending nozzle, such as a card reader and/or a cash payment mechanism.

An embodiment of the method of the invention includes the steps of (a) providing an apparatus for bulk fluid vending, comprising at least one fluid storage tank for storing fluid, a controller communicatively connected to the at least one fluid storage tank for managing flow of fluid from the fluid storage tank, at least one fluid flow line connected to the controller, and a vending mechanism connected to the fluid flow line and disposed at a predetermined location remote from the fluid storage tank and adapted to be actuated by a customer; (b) detecting a dispense signal at the vending mechanism, and (c) delivering fluid from the fluid storage tank to the vending mechanism The apparatus and methods of the invention provide an economical, sustainable and environmentally friendly means of dispensing windshield washer fluids to end users. The invention permits system owners increase profits and better satisfy end user customers. The system minimizes ordering and shipping costs versus common supply by way of plastic jugs (typically approx. 1 gallon containers) shipped and provided in boxes of four (4) or more, and plastic lined boxes. Retail team workers spend less time handling merchandise and can thus focus on customers specific needs. Equipment costs are minimized. Inventory, and therefore cost, is minimized, and so is inventory processing. Product shrinkage is minimized. Paperwork is minimized. And finally, plastic and cardboard trash and waste is minimized both at the system owners premises and in local landfills. End user customer's windshield washing experience is improved by always having a full, clean squeegee bucket.

Figure 18:
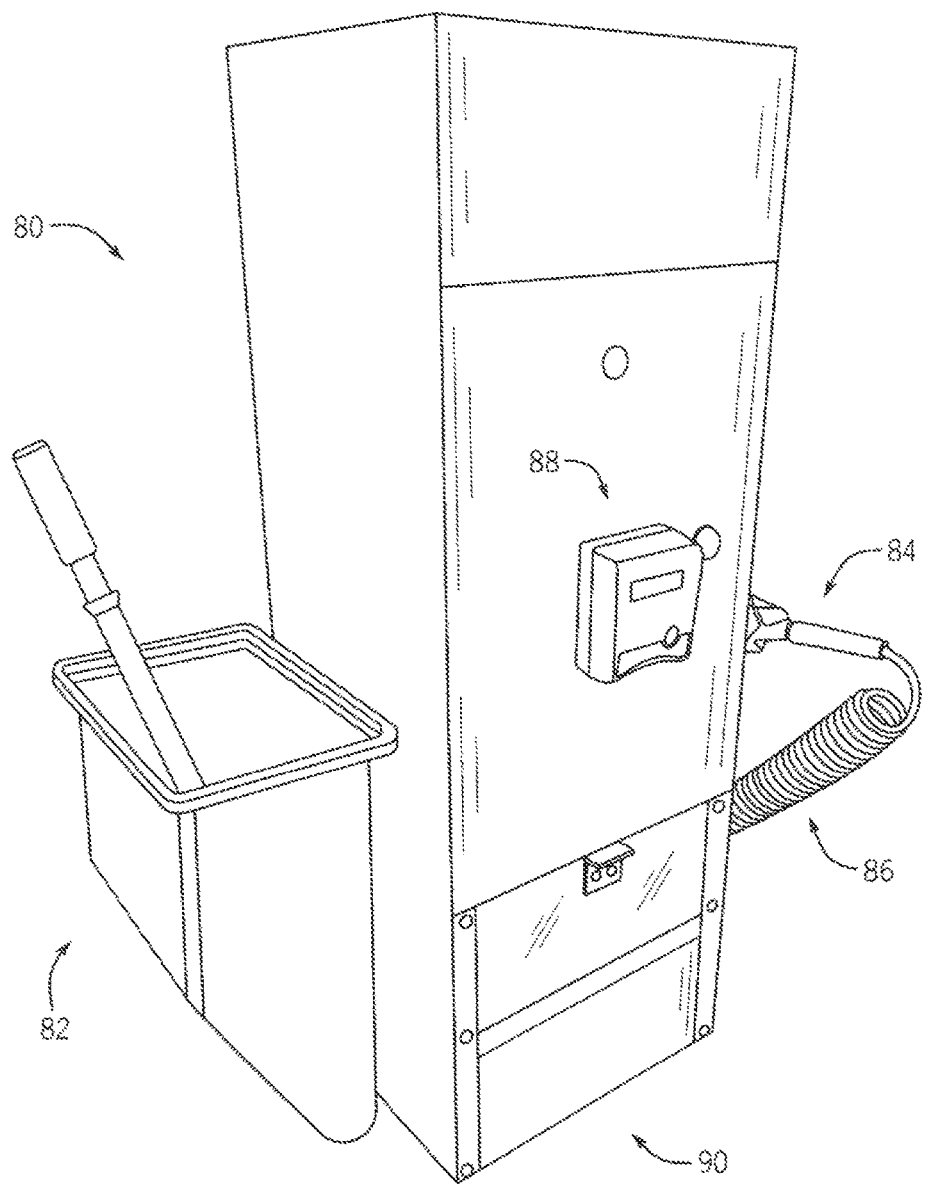
FIG. 18 is a perspective view of an alternative embodiment of the bulk windshield washer fluid vending system dispenser.
Figure 19A:
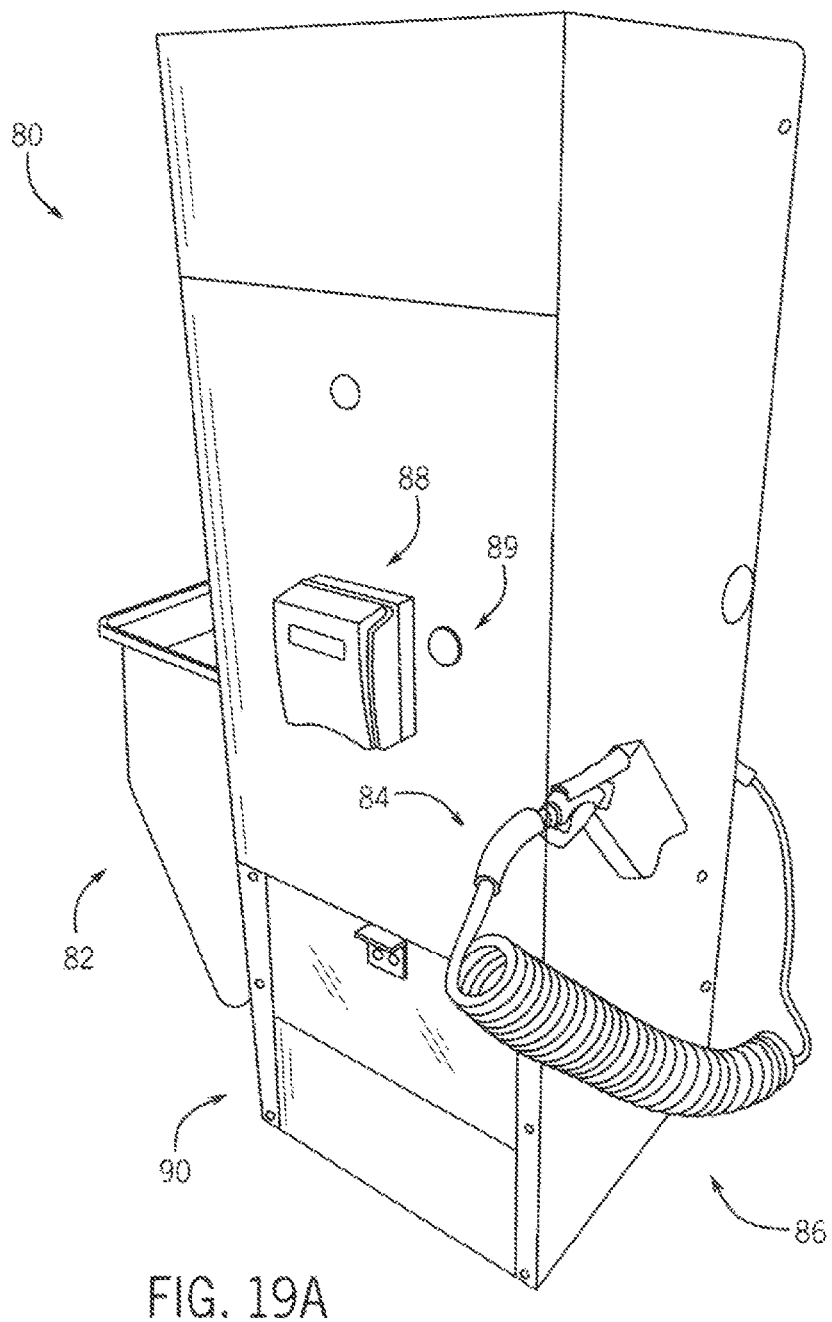
FIG. 19A is a further perspective view.
Figure 19B:
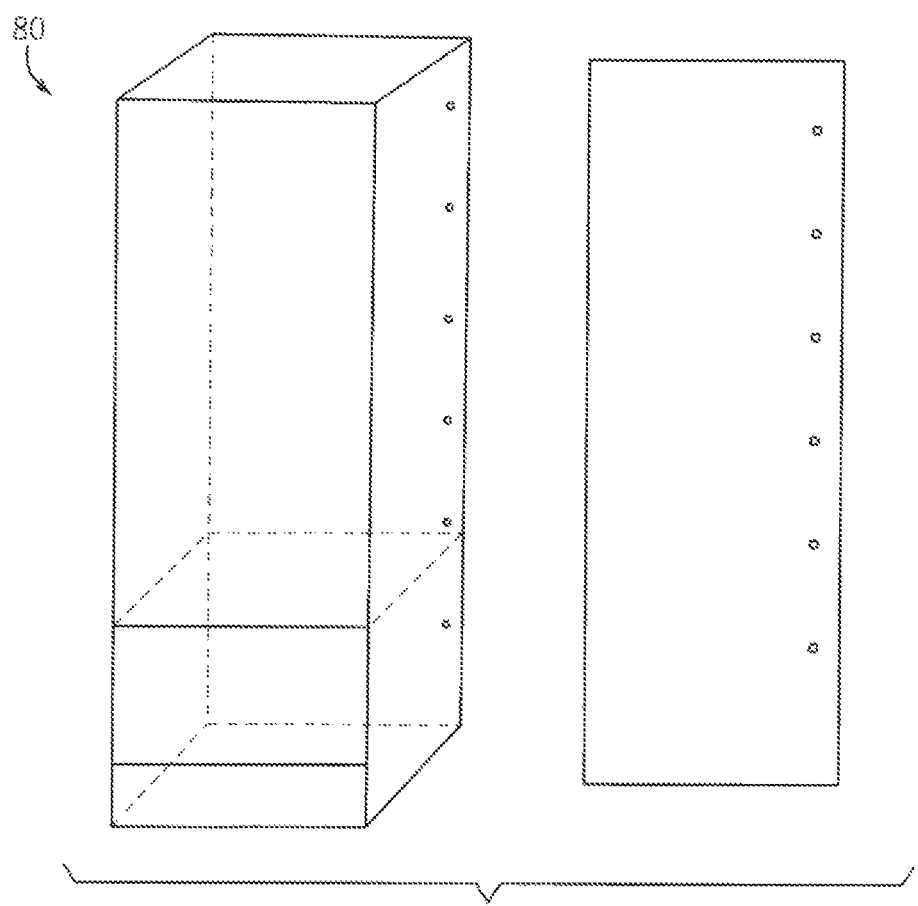
FIG. 19B is an alternative format of the view of FIG. 19B.
Figure 20A:
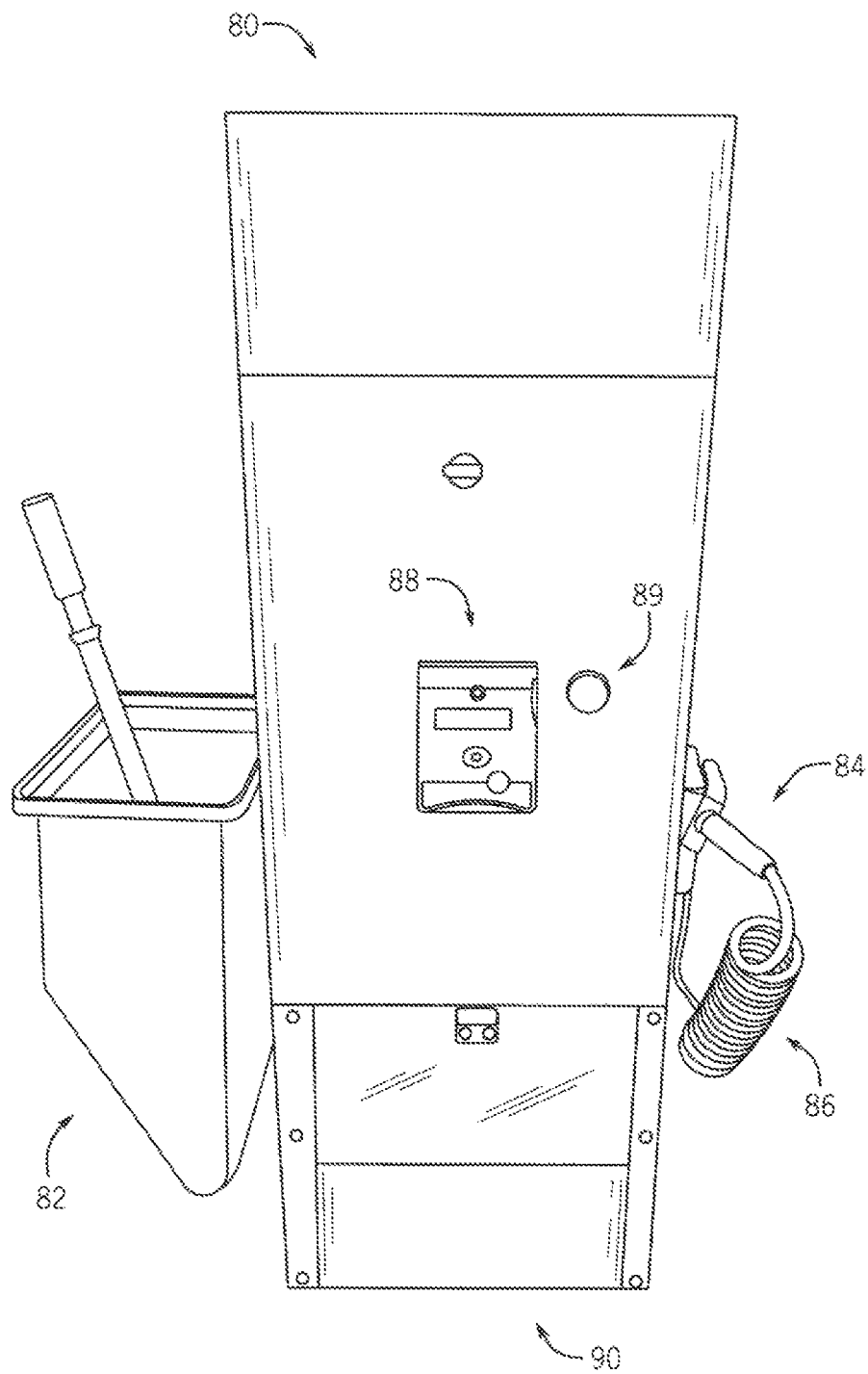
FIG. 20A is a front view of the dispenser.
Figure 20B:
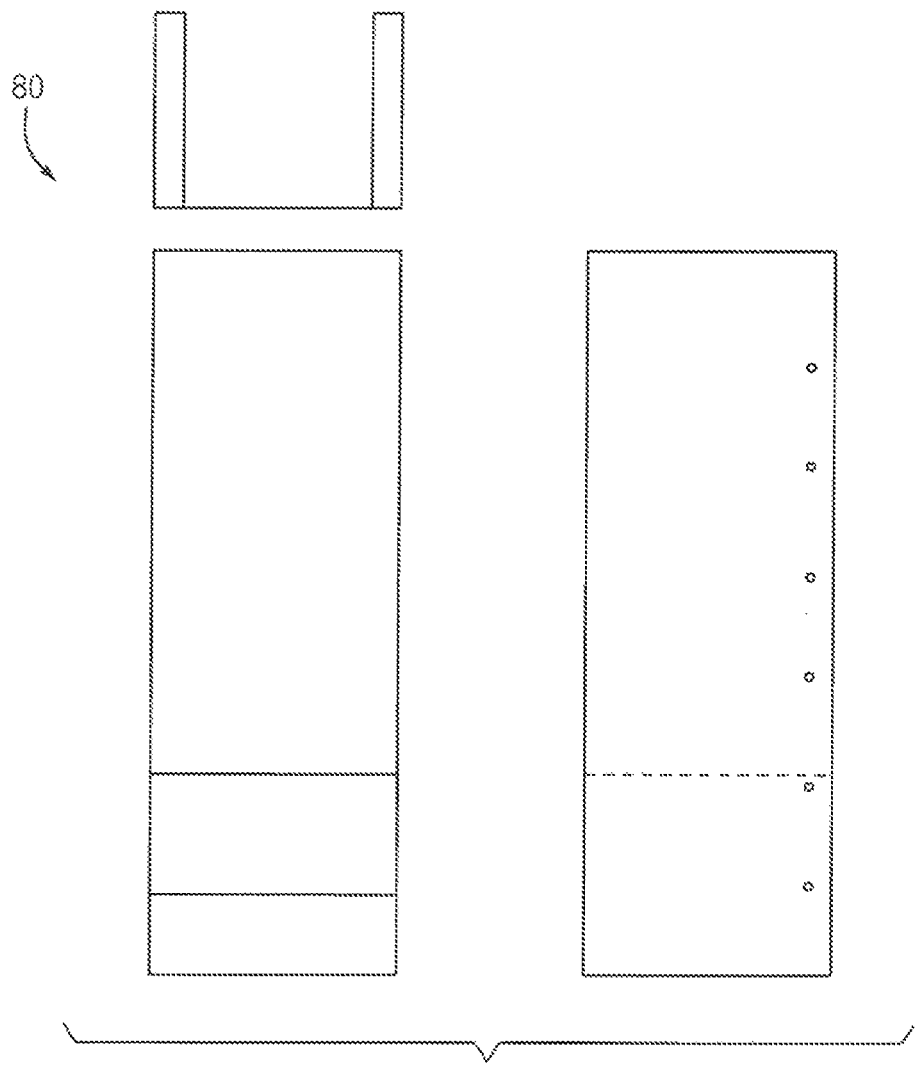
FIG. 20B is an alternative format of the view of FIG. 20A.

FIGS. 18-20 show an alternative embodiment of the vending unit or dispenser 80 of the system. This embodiment of the vending unit 80 has all of the structural and functional features described and shown for unit 13. Additionally, it has a washer fluid bucket 82 coupled to its exterior for holding cleaning fluid and a hand squeegee for hand washing by a customer/user. A hand holdable trigger dispensing mechanism 84 is connected via a hose 86 for dispensing fluid from the unit 80 into the customer's vehicle windshield washer container or reservoir (on board the customer's vehicle). A product selection control panel 88 is disposed on the front face of the unit 80. The control panel 88 permits the customer to select a desired product option via an LCD screen, product option press buttons, and a start button. The panel 88 also has a credit/debit card reader. Preferably, the product options include a first quantity, for example one (1) gallon, and at least one smaller or larger quantity, for example one half (½) gallon of fluid. Significantly, the product options also preferably include the option to purchase or otherwise have dispensed a portable container 92 to hold all or a portion of the selected quantity of fluid. Switch 89 is also disposed on the front face to enable a customer to have more time to dispense fluid from the hand trigger 84. Importantly, the unit 80 also has a container dispenser 90 for dispensing one or more of the portable dispensers 92. The portable dispensers 92 are useable by the customer to hold, transport and store all or a portion of the fluid dispensed by the unit 80. In a typical case, a customer will be alerted to an empty vehicle washer fluid condition by a vehicle alert or out of washer condition. The customer will then select a quantity of fluid that matches or approximates the size of the vehicle washer container using the control panel 88. All of the fluid will be dispensed into the vehicle fluid container via the hand trigger 84 and hose 86. In some cases, the user will attempt to fill their vehicle washer reservoir when the reservoir is partially filled, for example after receiving a low reservoir alert from the vehicle. In such case, the reservoir will be filled before all of the purchased quantity of fluid is dispensed. The portable container dispensed from the unit 80 may then be used to receive and store this remaining, unused, portion of purchased fluid. A further option for the customer is to use the portable container to receive all of the volume of purchased fluid at from the outset. The customer may store the container on board the vehicle, for example in the trunk, or take it to their premises for storage and later use.

Figure 21:
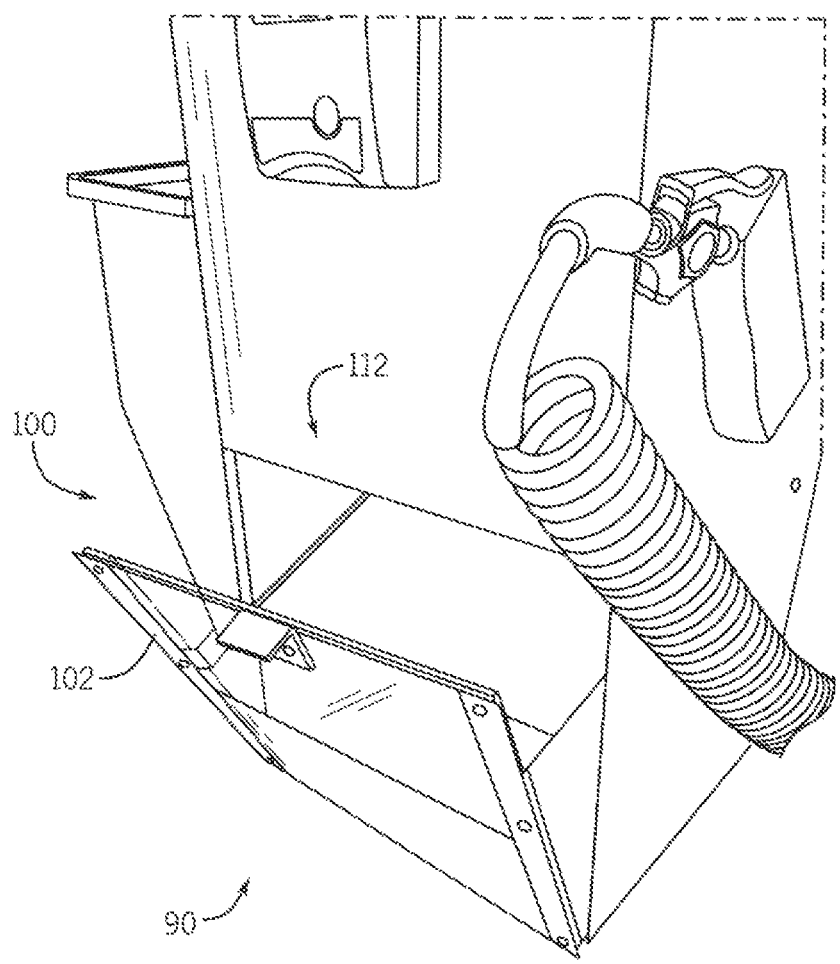
FIG. 21 is a perspective view of the container output feature of the dispenser.
Figure 22:
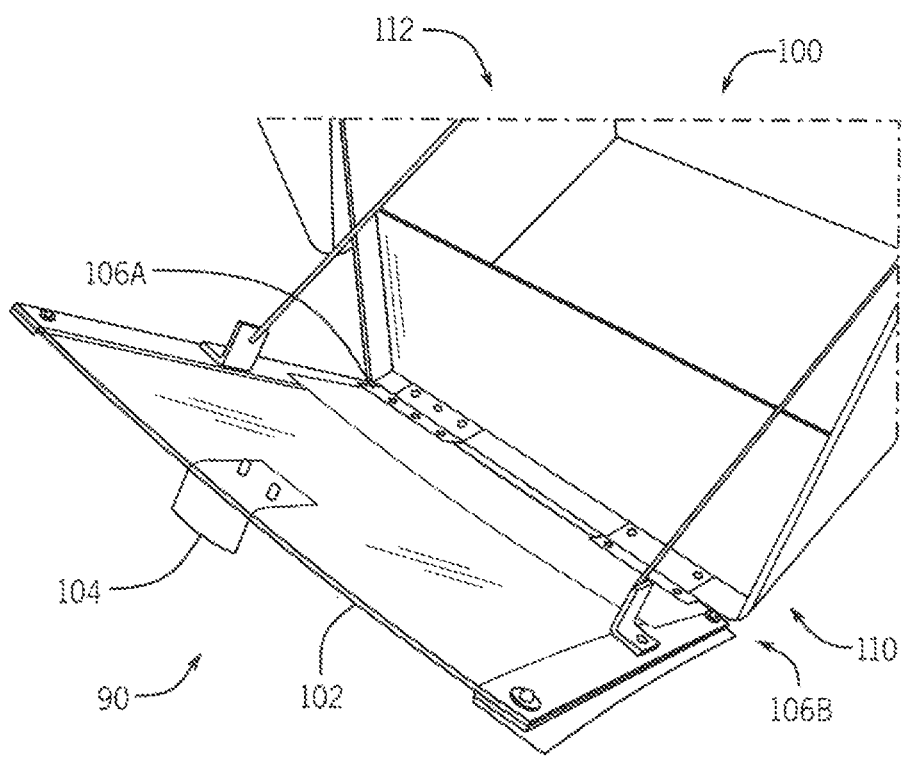
FIG. 22 is a further view of the container dispensing feature.
Figure 23:
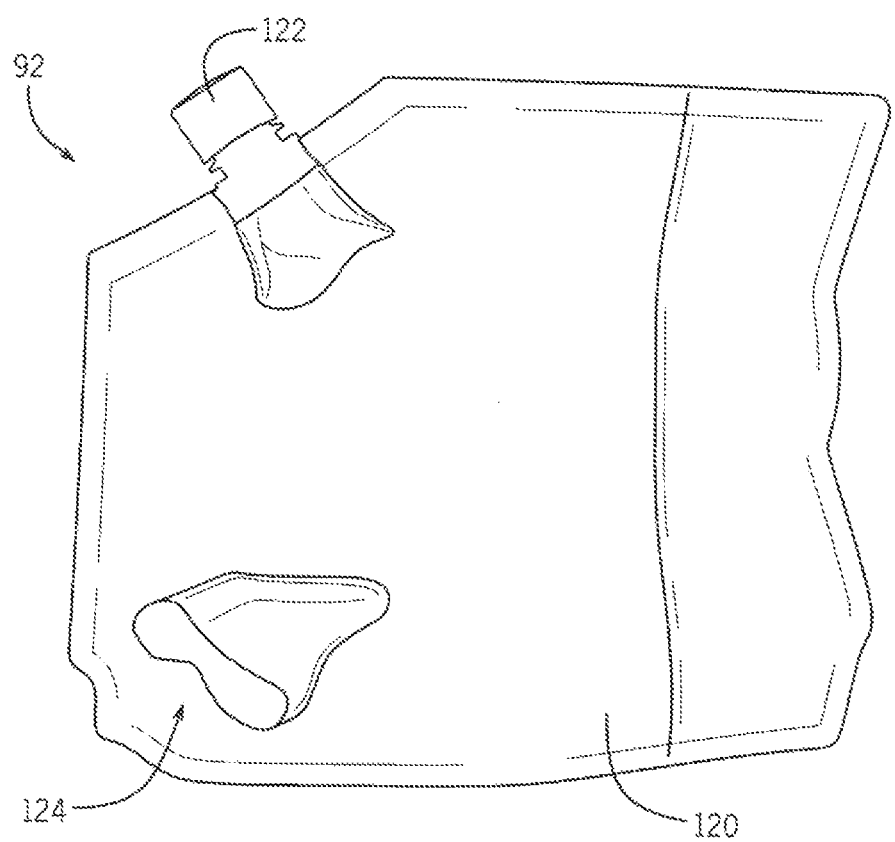
FIG. 23 is a front view of an embodiment of a container output by the dispenser to hold excess washer fluid.

FIGS. 21 and 22 show the container dispenser 90 feature of the unit 80. The dispenser provides a method of sale that ensures the customer has the opportunity to get the full quantity of fluid they pay for. The container dispenser 90 includes a chamber 100 disposed in the body of the unit 80 that has predetermined dimensions for holding a supply of containers. In a preferred embodiment, the horizontal dimension of the chamber 100 is at least approximately 12 inches by 12 inches. The dispenser 90 also has a cover 102, preferably a hinged door for enclosing the supply of containers 92 disposed inside the chamber 100. The door 102 shields the containers from dirt, wind, rain, snow and the like. The door 102 hand actuatable by the customer via a hand grip 104 and hinges 106A/B. The door 102 is preferably substantially transparent to permit easy location of containers by the customer. The door 102 also preferably also has means to return the door to a closed condition after use, such as one or more elastic cords 108A/B. In this case In the preferred embodiment, the chamber 100 has a front curb member 110 to secure the supply of containers in the chamber 100 while permitting ingress and egress of containers via access port 112 above the curb 110. The door is shown to be open and unlatched, but it may be controlled via a lock member (for example a solenoid actuated lock) to restrict access to containers in other embodiments. The chamber 100 is sized to hold a supply of a predetermined number of portable containers. Alternatively, the chamber 100 may hold one container, which is then dispensed into the chamber one at a time via an auger or other container transport mechanism. FIG. 23 is a front view of a preferred container 92 embodiment. In this embodiment, the portable container 92 is a flexible, expandable and collapsible polymeric bag body 120 which has a capped fluid ingress/egress port 122 and a handle aperture 124. The body 120 is preferably clear to permit visualization of the contents by the user during filling, storage and dispensing. The container 92 has a predetermined fluid volume of for example one (1.0) or one-half (0.5) gallons. In this embodiment, the bag 120 has a length of 12 inches and a width of 11 inches in a collapsed state.

Figure 24:
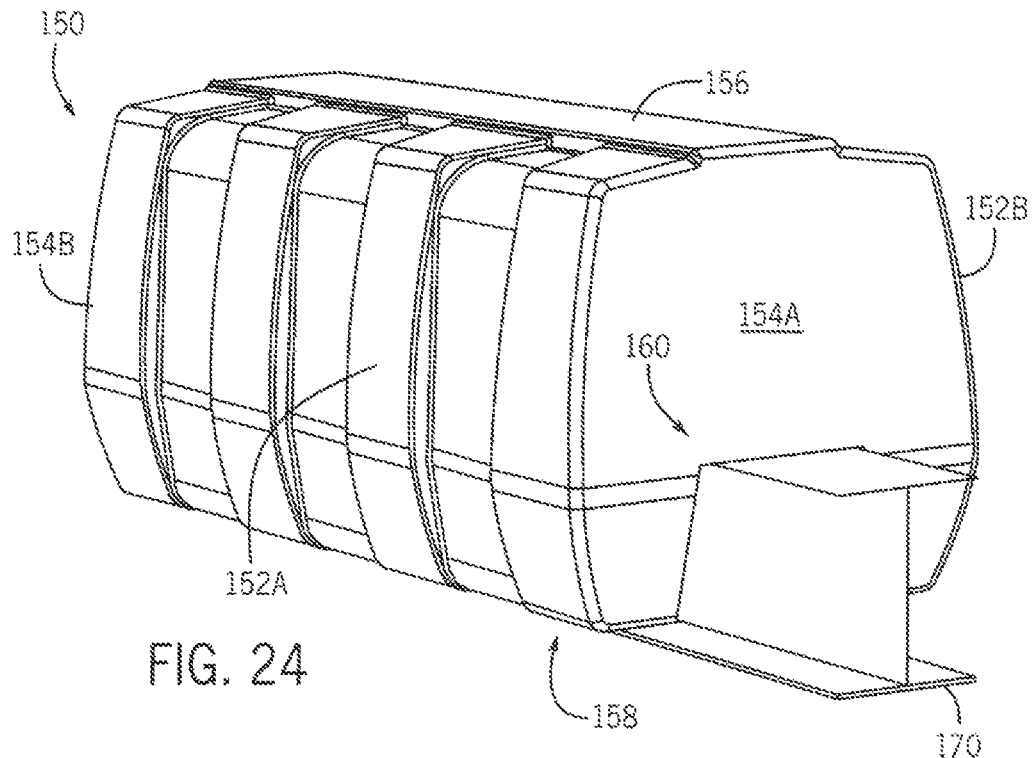
FIG. 24 is perspective view of an alternative embodiment of the system tank.
Figure 25:
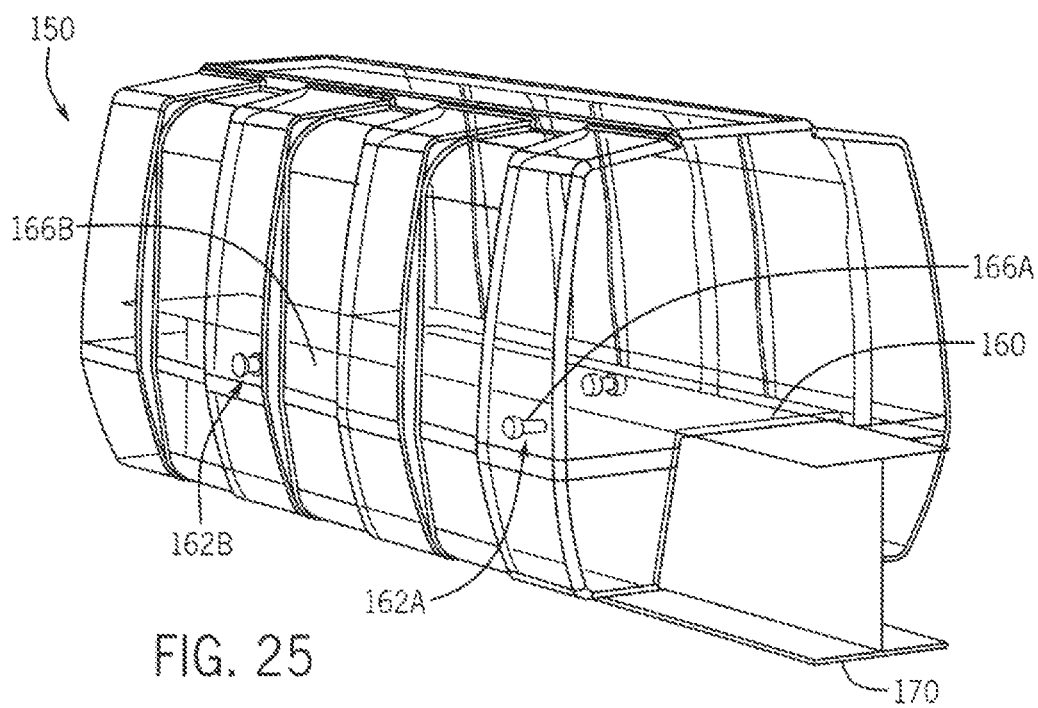
FIG. 25 is perspective view of the tank, in phantom showing internal features of the tank.

FIGS. 24 and 25 show an alternative embodiment of the bulk storage tank 150 of the system. This tank 150 embodiment provides enhanced tank stability for safety and durability, and a low profile to hide the tank for optimum architectural aesthetics. The tank 150 has a side walls 152A/B, end walls 154A/B, and a top wall 156. Significantly, bottom wall 158 has a channel 160, preferably oriented along a longitudinal axis of the tank 150), that sits over and around an I-Beam 170 disposed on the roof of a gas island of a gas station. The channel 160 has a rectilinear, upside down, U-shaped configuration. The channel 160 permits the tank to be closely disposed with respect to the I-Beam for increased stability. It is essentially integrated or merged with the top and 2 sides of the beam 170. Simultaneously, the channel 160 permits the tank to have a very low profile such that is may be hidden from view on the top of the gas island roof. The integrated, low-profile disposition secures the tank from wind, and provides enhanced architectural aesthetics. Preferably, the tank 150 is also mechanically secured to the I-Beam 170 via two or more bolt/nut fasteners 162A/B. Most preferably, the tank 150 has a pair of horizontal sleeves that pass from side wall 152A to side wall 152B that permit passage of the bolt/nut fasteners 162 through the beam 170 and simultaneously shield the fasteners 162 from contact with the fluid contents of the tank 150. Appropriate fluid ingress and egress ports are provided on the tank 150 for filling the tank with bulk fluid and for interconnection with the remaining elements of the bulk fluid vending system 10.

The embodiments above are chosen, described and illustrated so that persons skilled in the art will be able to understand the invention and the manner and process of making and using it. The descriptions and the accompanying drawings should be interpreted in the illustrative and not the exhaustive or limited sense, The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

The invention claimed is:

1. An apparatus for dispensing bulk fluids, comprising
   a. at least one fluid storage tank for storing fluid,
      i. wherein the bulk fluid is windshield washer fluid; and
      ii. wherein the fluid storage tank has a capacity of approximately 100 gallons, with a low profile structure that is adapted to be integrally supported by an I-Beam of a Gas Island Roof System;
   b. a controller communicatively connected to the at least one fluid storage tank for managing flow of fluid from the fluid storage tank,
   c. at least one fluid flow line connected to the controller,
   d. a vending mechanism connected to the fluid flow line and disposed at a predetermined location remote from the fluid storage tank and adapted to be actuated by a customer, the vending mechanism being monitored by the controller, the vending mechanism including:
      i. a hand holdable fluid vending nozzle adapted to be used on a customer to dispense fluid to windshield washer reservoir of a vehicle, and
      ii. a customer access unit for controlling flow of fluid to the vending nozzle, the customer access unit comprises: (1) an LCD display panel, (2) a plurality of product selection option buttons, (3) a start button, and (4) a card reader or a cash payment mechanism; and
   e. a dispenser for dispensing portable, hand holdable fluid containers that may contain all or a part of the bulk fluid dispensed from the apparatus, the dispenser including:
      i. a chamber for holding a predetermined supply of portable containers,
      ii. and an access door enclosing the containers in the chamber.

2. The apparatus of claim 1, wherein the fluid storage tank has a bottom floor including an channel that is adapted to fit over and around an I-Beam.

3. The apparatus of claim 1, wherein there are a plurality of fluid storage tanks communicatively connected to a control box.

4. The apparatus of claim 1, wherein the controller permits a predetermined flow of fluid from the fluid storage tank to the fluid flow line upon sensing a low fluid condition in the vending mechanism.

5. The apparatus of claim 4, wherein the controller includes a flow rate sensor.

6. The apparatus of claim 1, wherein the controller includes a pump.

7. The apparatus of claim 1, wherein the controller manages flow via gravity flow.

8. The apparatus of claim 1, wherein the vending mechanism comprises a fluid bucket for holding a predetermined volume of fluid and has an access aperture adapted to hold and supply fluid to a squeegee tool.

9. The apparatus of claim 1, wherein the portable, hand holdable fluid containers have a flexible, expandable polymeric bag structure.

10. An apparatus for bulk windshield washer fluid vending at a service station, comprising:
    (a) at least one fluid storage tank for storing windshield washing fluid having a capacity of at least 100 gallons, with:
        (i) a compact structure that is adapted to be integrally supported by an I-Beam of a Gas Island Roof System, and
        (ii) the fluid storage tank having a bottom floor including an channel that is adapted to fit over and around an I-Beam;
    (b) a controller communicatively connected to the at least one fluid storage tank for managing flow of fluid from the fluid storage tank, the controller including:
        (i) a float mechanism disposed in the fluid storage tank or the vending mechanism,
        (ii) the controller permitting a predetermined flow of fluid from the fluid storage tank to the fluid flow line upon sensing a low fluid condition in the vending mechanism, and
        (iii) a flow rate sensor;
    (c) at least one fluid flow line connected to the controller;
    (d) a vending mechanism connected to the fluid flow line and disposed at a predetermined location remote from the fluid storage tank and adapted to be actuated by a customer, wherein the vending mechanism comprises a hand holdable fluid vending nozzle adapted to be used on a customer to dispense fluid to a vehicle windshield washer reservoir, and a customer access unit for controlling flow of fluid to the vending nozzle, the customer access unit including: (i) an LCD display panel, (ii) a plurality of product selection option buttons, (iii) a start button, and (iv) a card reader or a cash payment mechanism;
    (e) wherein the vending mechanism further comprises a fluid bucket for holding a predetermined volume of fluid and has an access aperture adapted to hold and supply fluid and a squeegee tool; and
    (f) means to dispense all or a portion of the fluid to a portable, hand holdable container, the means to dispense including (i) a chamber for holding a predetermined supply of portable containers and, (ii) an access door enclosing the containers in the chamber; and
    (g) wherein the portable, hand holdable containers have a flexible, expandable polymeric structure.

11. The apparatus of claim 10, wherein the controller monitors supply via a float mechanism disposed in the fluid storage tank or the vending mechanism.

* * * * *